J. F. RITTENHOUSE.
HAND SEEDER.
APPLICATION FILED MAR. 20, 1913.
1,096,950.
Patented May 19, 1914.
2 SHEETS—SHEET 2.
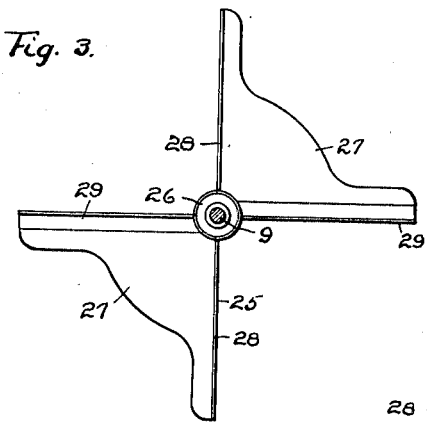
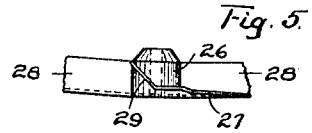
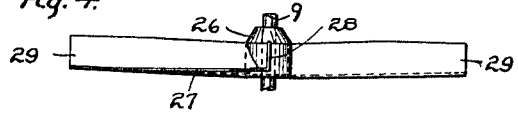
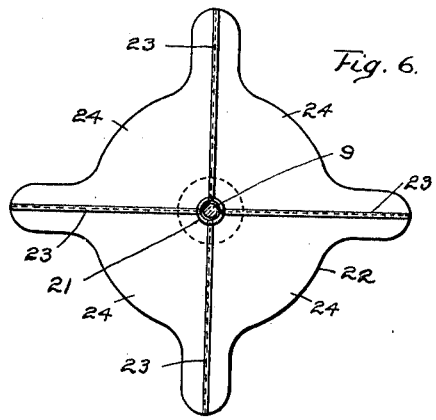
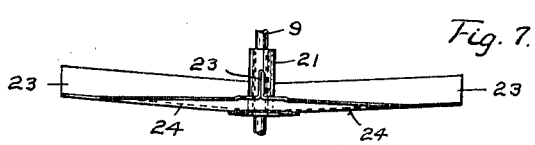
WITNESSES
H. J. Kiess
Helen F. Glenn
INVENTOR
James F. Rittenhouse
BY
Taylor & Hulse
ATTORNEYS.

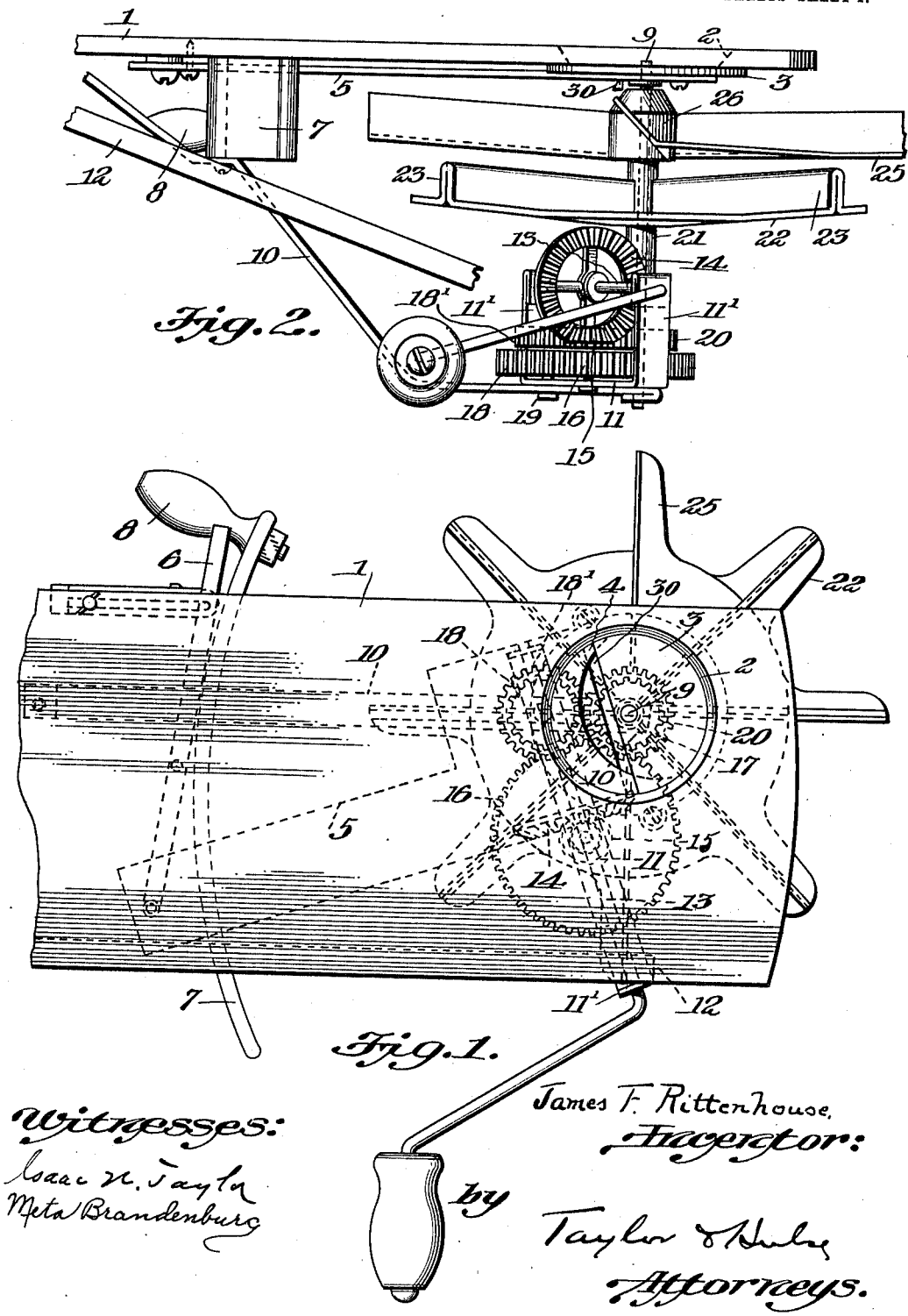

UNITED STATES PATENT OFFICE.

JAMES F. RITTENHOUSE, OF LIBERTY MILLS, INDIANA.

HAND-SEEDER.

1,096,950.  Specification of Letters Patent.  Patented May 19, 1914.

Application filed March 20, 1913. Serial No. 755,584.

*To all whom it may concern:*

Be it known that I, JAMES F. RITTENHOUSE, a citizen of the United States, and resident of Liberty Mills, in the county of Wabash and State of Indiana, have invented new and useful Improvements in Hand-Seeders, of which the following is a specification.

My invention relates to hand seeders having a plurality of revoluble wheels upon which the seed is fed and by which it is distributed over the ground. Its object is to provide a novel, simple and durable device which shall be highly efficient for distributing seed uniformly on to the ground.

The invention consists in the novel combination and arrangements of parts hereinafter described and illustrated in the drawings, in which drawings—

Figure 1 is a plan view of a device constructed according to my invention, the seed holding bag being removed from the same; Fig. 2, a side elevation of the same; Fig. 3, a plan view of the upper distributer wheel; Fig. 4, a side view of the same; Fig. 5, a fractional side view of same taken at right angles to the view point of Fig. 4; Fig. 6, a plan view of the lower distributer wheel and Fig. 7, a side elevation of the same.

Referring to the drawings, 1 is the bottom of the device to which the usual upwardly extending seed holding bag (not shown) is attached for containing the seed to be sown. At a suitable point in board 1 is provided the usual opening 2 for the passage of the seed. On the lower side of the bottom and underlapping the opening 2 is a plate 3 having a feed opening 4 extending part way across opening 2. A slide 5 is also secured to the lower side of bottom 1 and is adapted to be reciprocated by lever 6 which is pivoted to bottom 1, to coöperate with plate 3 for varying the effective size of opening 4 in the plate and thereby control the discharge of the seed through openings 2 and 4.

Secured to the lower side of bottom 1 is a cross bar 7, which may be curved as shown, handle 8 being secured to one projecting end of the bar, the other projecting end of the bar being intended to be brought against the side of the body of the operator, while his left hand is grasping handle 8 and his right hand is free to rotate the distributing mechanism about to be described.

A vertical revoluble shaft 9 projects through plate 3 and opening 2, its lower end being supported in the forward end of a bracket 10 which is secured at its rear end to bottom 1 and to cross bar 7. A V shaped bracket 11 is connected near one end to bracket 10 somewhat rearwardly of shaft 9, the bracket extending preferably diagonally of bottom 1 and near its other end it is connected to one end of a bar 12 which is secured at its other end to bottom 1.

Crank shaft 13 is revolubly carried in the upwardly extending arms 11' of bracket 11 and on this shaft is fixed a gear wheel 14 which is in mesh with a pinion 15 which is secured to a horizontal concentric gear wheel 16 revolubly carried by bracket 11. Gear wheel 16 is in mesh with gear 17 which is secured to the lower end of shaft 9 and with an idler gear 18 which is loosely mounted on bracket 10, the post 19 on which it is mounted serving to secure brackets 10 and 11 together. Idler gear 18 carries a gear 18' above it which is in mesh with a gear wheel 20 which is secured to a sleeve 21 which encircles shaft 9 and is revoluble thereon. At the upper end of sleeve 21 is secured a horizontal disk or distributer wheel 22 having four ribs 23 radiating from its center which project vertically upward from the disk and are formed, preferably, by crimping the metal at the desired points, thereby providing the seed catching portions 24 between the ribs. A suitable distance above disk 22 is a second horizontal disk or distributer wheel 25 which is secured to shaft 9 and is immediately below the slide 5. Wheel 25 consists of a hub 26 which is secured to shaft 9, its upper end being beveled or tapered toward the shaft so that the seed falling through the feed opening will not lodge on said hub. Secured to the hub and at diametrically opposite points are two disks of sheet metal 27, each of which is substantially a right angle triangle. One radial edge of each disk is turned upwardly at a right angle to form a rib 28 and the other radial edge of each disk is bent upwardly at an obtuse angle to the disk and forms a fan 29 which tends to drive seed onto the lower distributer wheel as hereafter described. The upper wheel is, therefore, provided with alternate seed receiving disks 27 and openings, each occupying substantially one-fourth of the perimeter of the wheel.

When slide 5 is opened to expose the desired portion of opening 4, which is dependent upon the kind of seed to be sown, the seed will fall toward the upper wheel. A guide 30 which is secured to the lower side of plate 3 and overlaps the hub 26 tends to direct the flow of the seed to the proper side of the wheel. Approximately one-half the seed will fall onto disks 27 and the other half will fall through openings between them onto the lower wheel, the fans 29 serving to drive the seeds through those openings onto portions 24 of wheel 22 and ribs 28 on the upper wheel serving to discharge the seed which falls onto the disks 27 therefrom. Ribs 23 on wheel 22 serve to discharge the seed from the portions 24 of the lower wheel. Since the two wheels are independently mounted on shaft 9 and sleeve 21 and since gear wheel 16 drives gear 17 which is secured to shaft 9 and also drives gear 20 which is secured to sleeve 21 by means of idler gears 18, 18′ the two distributer wheels are rotated in opposite directions. One half of the seed is therefore thrown or delivered by the upper wheel in one direction and the other half is delivered by the lower wheel in the opposite direction. The seed is consequently uniformly spread over the ground.

By placing the wheels above the driving mechanism I materially shorten the distance the seed is required to fall before it strikes the wheels and also to prevent all lodgment of the seed in the driving mechanism.

What I claim is:

1. In a hand seeder the combination with a bottom, of a shaft revolubly supported on the bottom, and two distributer wheels independently mounted on the shaft, one of said wheels consisting of two laterally spaced disks radiating from diametrically opposite sides of the shaft, each disk having a rib extending along one radial edge and the other edge being upturned to form a fan blade which projects over the intervening open space between said disk and the ribbed edge of the adjacent disk.

2. In a hand seeder the combination with a bottom, of a shaft supported on the bottom, a distributer wheel secured to the shaft, a hub revolubly supported on the shaft, a distributer wheel secured to the hub and means to rotate the shaft and hub simultaneously in opposite directions, the last named distributer wheel being above the former wheel and consisting of two laterally spaced triangular disks projecting from diametrically opposite sides of the hub, one radial edge of each disk having a vertical rib extending along the same and the other radial edge of each disk being upturned to form a fan blade which extends from said edge toward the ribbed edge of the other disk, the two disks forming one-half of the upper wheel.

In witness whereof I have hereunto signed my name this 14th day of March, 1913.

JAMES F. RITTENHOUSE.

Witnesses:
ISAAC E. GUIGERICH,
L. EDWARD FITCH.

---

Copies of this patent may be obtained for five cents each, by addressing the "Commissioner of Patents, Washington, D. C."